US008875367B2

(12) United States Patent
Young et al.

(10) Patent No.: US 8,875,367 B2
(45) Date of Patent: Nov. 4, 2014

(54) INCREASED PROCESS DAMPING VIA MASS REDUCTION FOR HIGH PERFORMANCE MILLING

(71) Applicants: Keith A. Young, St. Peters, MO (US); Eric J. Stern, Valmeyer, IL (US); Thomas L. Talley, Granite City, IL (US); Randolph B. Hancock, St. Peters, MO (US)

(72) Inventors: Keith A. Young, St. Peters, MO (US); Eric J. Stern, Valmeyer, IL (US); Thomas L. Talley, Granite City, IL (US); Randolph B. Hancock, St. Peters, MO (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 13/628,518

(22) Filed: Sep. 27, 2012

(65) Prior Publication Data

US 2013/0019445 A1    Jan. 24, 2013

Related U.S. Application Data

(62) Division of application No. 12/502,462, filed on Jul. 14, 2009, now Pat. No. 8,296,919.

(51) Int. Cl.
*B23Q 17/00* (2006.01)
*B23C 5/00* (2006.01)
*B23C 5/10* (2006.01)

(52) U.S. Cl.
CPC ............. *B23C 5/003* (2013.01); *B23C 2222/32* (2013.01); *B23C 2226/61* (2013.01); *B23C 2250/16* (2013.01); *B23C 5/10* (2013.01); *B23C 2222/28* (2013.01)
USPC ...................................... 29/407.05

(58) Field of Classification Search
CPC ...... B23C 5/003; B23C 5/10; B23C 2250/16; B23C 2222/32; B23C 2226/61; B23C 2222/28
USPC ......... 29/407.05, 407.07, 450, 451, 458, 459, 29/515, 516, 527.1, 530, 557, 558; 76/115; 409/131, 234, 141, 132; 407/32; 82/158; 408/143
See application file for complete search history.

(56) References Cited

U.S. PATENT DOCUMENTS 5,518,347 A * 5/1996 Cobb, Jr. .............. 409/141
7,591,209 B2 * 9/2009 Murakami et al. .......... 82/158
8,296,919 B2 * 10/2012 Young et al. .......... 29/407.05

* cited by examiner

*Primary Examiner* — John C Hong
(74) *Attorney, Agent, or Firm* — Felix L. Fischer

(57) ABSTRACT

A cutting tool incorporates a body terminating in cutting edges distal from a chuck mount and having an axial bore for reduced mass to raise the natural frequency of the tool. In certain of the embodiments, the body is preformed from a steel or carbide blank into a cylindrical pipe forming the hollow bore prior to grinding of the cutting edges. Filling of the bore with a light weight polymer to further absorb vibration can also be employed.

16 Claims, 11 Drawing Sheets

INCREASED PROCESS DAMPING VIA MASS REDUCTION FOR HIGH PERFORMANCE MILLING

REFERENCE TO RELATED APPLICATIONS

This application is divisional of copending U.S. application Ser. No. 12/502,462 filed on Jul. 14, 2009 which is in turn a continuation-in-part of application Ser. No. 11/757,547 filed on Jun. 4, 2007 both entitled INCREASED PROCESS DAMPING VIA MASS REDUCTION FOR HIGH PERFORMANCE MILLING by Keith A. Young, Eric I. Stern, Thomas L. Talley, and Randolph B. Hancock and having a common assignee with the present application the disclosure of which is incorporated herein by reference.

FIELD

This invention relates generally to the metals machining and more particularly to a bore relieved milling tool having reduced mass for process damping and high performance milling.

BACKGROUND

Finish machining of deep pocket aircraft structural components is limited by deflection and chatter. Modern designers are consistently pursuing weight reduction opportunities in metallic structure. Machined parts with deep pockets and small corner radii require long slender end mills to cut the corners. Long slender cutting tools are more susceptible to chatter and vibration than shorter more rigid tools. Long cutting tools exhibit lower natural frequencies, which reduces the process damping effects which can stabilize chatter. This requires small cuts and slower cutting speeds to avoid chatter, which can increase manufacturing costs. Current methods to increase machining rates include using higher cutting speeds and tools with more cutting edges. Both of these techniques can result in more chatter for longer cutting tools.

Current methods exist to reduce cutting tool vibration and chatter. These include using an eccentric relief on the cutting tool to enhance the rubbing of the cutter on the machined part. This rubbing will also stabilize the cutting tool. The use of an eccentric relief is a benefit for shorter cutting tools, but the effect is not useful for longer tools, when the resonant frequency of the cutting tool creates a wavelength that is longer than the eccentric relief.

It is therefore desirable to provide modified cutting tools which retain or increase process damping effects to stabilize chatter.

SUMMARY

The embodiments disclosed herein provide a method for fabrication of a cutting tool incorporating a body terminating in cutting edges distal from a chuck mount and having an axial bore. In certain of the embodiments, the body is pre-formed from a steel or carbide blank into a cylindrical pipe forming the hollow bore.

For exemplary embodiments of the method, a threshold established for a cutting tool mass for resonant frequency and stability followed by reducing the cutting tool mass below the threshold through introducing a central bore in the tool for a reduced wall shank. Establishing a threshold for a cutting tool mass is accomplished by determining pocket depth and tool length and calculating frequency response of the tool based on a spindle configuration for a given stiffness to determine mass. A threshold mass is then identified for desired frequency response and the mass is adjusted to obtain stability lobes positioned for maximized depth of cut.

In alternative embodiments, the axial bore is filled with a vibration absorbing material. A light weight polymer is used in exemplary embodiments.

BRIEF DESCRIPTION OF THE DRAWINGS

These and other features and advantages of the present invention will be better understood by reference to the following detailed description when considered in connection with the accompanying drawings wherein.

DETAILED DESCRIPTION

Figure 1:
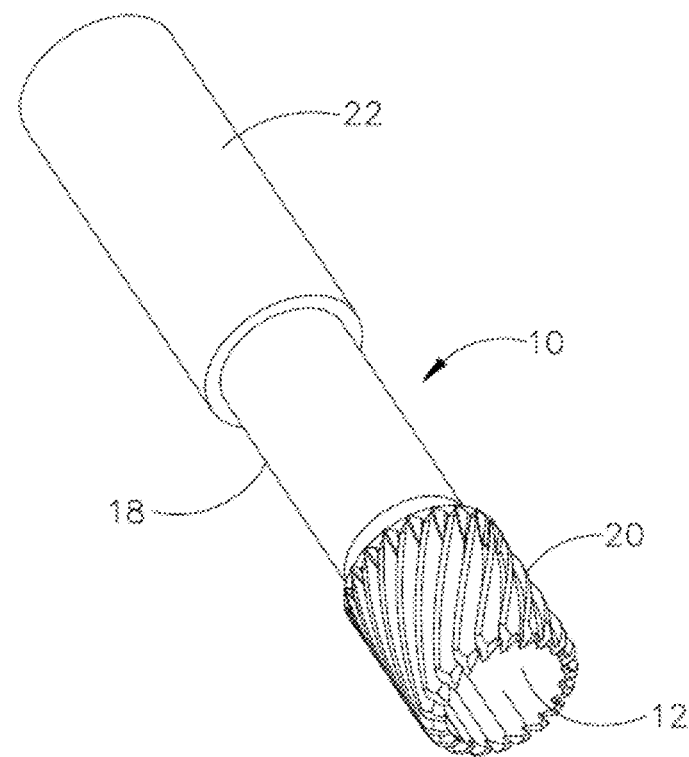
FIG. 1 is an isometric side view of an embodiment of the reduced mass tool.
Figure 2:
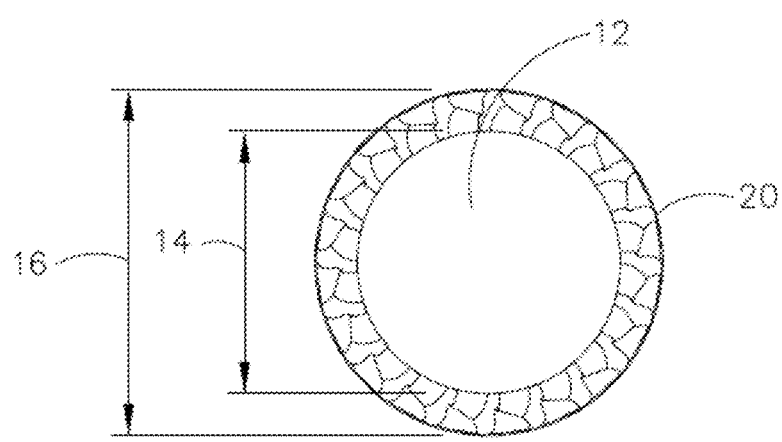
FIG. 2 is a bottom axial view of the embodiment of FIG. 1.

The embodiments of the tool disclosed herein are applicable to rotating milling cutters and stationary boring cutters where the work piece rotates instead of the tool. As shown in FIG. 1, an embodiment of the reduced mass tool 10 is hollow; incorporating a center bore 12. FIG. 2 demonstrates that for this embodiment, the center bore employs a large diameter 14 with respect to the overall diameter of the tool 16 and is aligned with the axis of rotation of the tool. Additionally, the tool shank 18 is necked down or relieved to further reduce mass with the cutting edges 20 formed at a first end of the tool and a chuck attachment 22 formed at the opposite end.

The cutting tool mass is reduced by pre-forming the carbide or steel blank into a cylindrical pipe before grinding the cutting edges. For the embodiment shown, a reduction of over half the mass of a conventional tool is achieved. The mass reduced form increases the resonant frequency of a milling cutter, as the example embodiment, without significantly reducing the tool stiffness. This allows the tool to cut with approximately the same static deflection, but with significantly reduced dynamic deflection and chatter, as will be discussed in greater detail subsequently. In alternative embodiments, boring of the center hole in the completed tool or prior to heat treating or sintering and grinding of cutting edges is accomplished.

Figure 4:
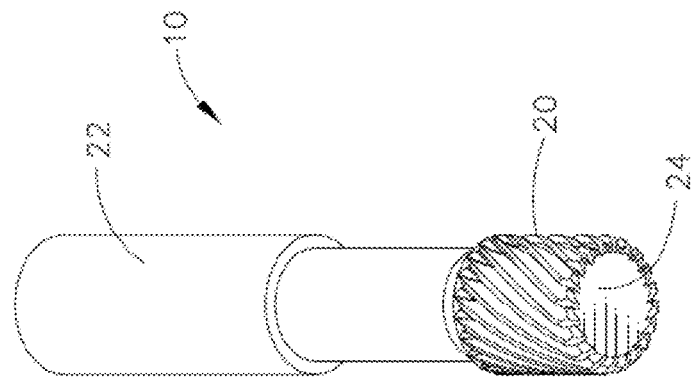
FIG. 4 is an isometric view of a filled embodiment of the tool.
Figure 3:
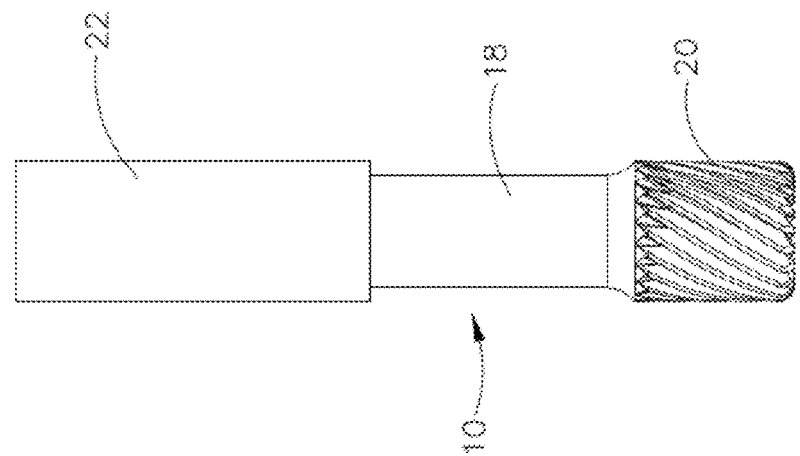
FIG. 3 is a side view of the embodiment of FIG. 1.

In alternative embodiments, the large hole in the center of the cutting tool is filled with a vibration absorbing material such as a light weight polymer 24 as shown in FIG. 4 to further absorb vibration. An exemplary polymer is silicon RTV 664B produced by General Electric. Alternative filler materials such as metallic or nonmetallic shot or pellets, a viscous liquid, oil or water, a resin, or another metal with higher material damping are anticipated in exemplary embodiments.

Testing of embodiments shown herein has shown a significant reduction in cutter vibration. The cutting tool with less mass vibrates at a higher frequency. The natural frequency, Wn, of the resulting mechanical system is given by Wn=sqrt (k/m), where k is the stiffness and m is the mass. As mass is reduced, the natural frequency is increased by the square root of the mass. Dynamic stiffness of the milling cutter is measured using impact testing with an accelerometer attached to the tool. By striking the tool with a mallet, the dynamic stiffness of the cutter is reported by a displacement Frequency Response Function (FRF) monitored on an oscilloscope output from the accelerometer. Tuning of resonant frequency by modifying the central hole diameter in the cutting tool can be accomplished for specific machining requirements such as tool rotational speed as desired. However, for most embodiments, achieving the highest frequency while maintaining necessary tool stiffness is desirable.

Figure 5:
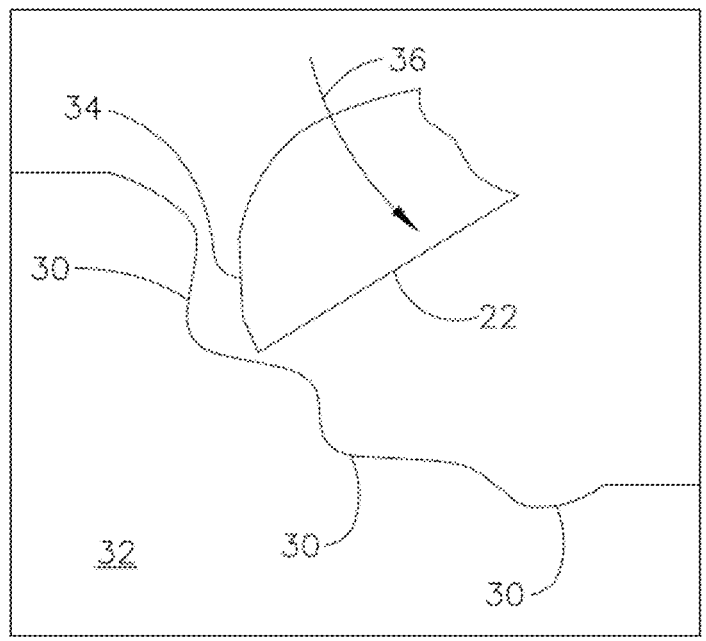
FIG. 5 is an illustration of the cutting profile effects of low frequency vibration in a tool without process damping.
Figure 6:
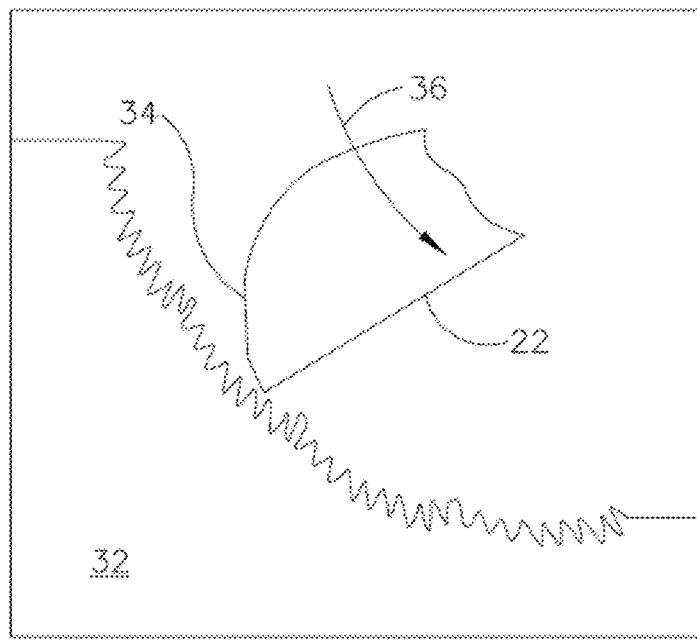
FIG. 6 is an illustration of the cutting profile with process damping provided by a tool incorporating the present invention.

Creating higher frequency response on the tool allows smearing by an eccentric relief or clearance ramp 34 of the tool which is not possible at lower frequency. As shown in FIG. 5, low frequency vibration of a tool without incorporation of the present invention creates cutting scallops 30 in working machine part 32 which exceed the effective capability of clearance ramp 34 on cutting edge 20 with tool rotational direction generally indicated by arrow 36. FIG. 6 demonstrates the higher frequency contact of the cutting edge in a tool comparable to the disclosed embodiments providing a smoother surface. For the embodiment shown, the clearance ramp is modified to incorporate a eccentric relief grind to enhance smearing on the rake face.

Figure 7:
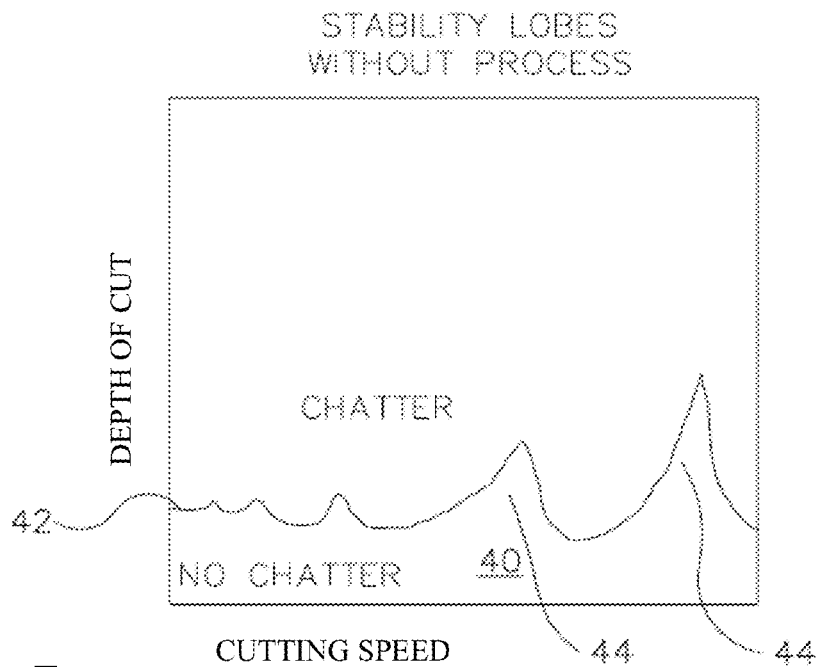
FIG. 7 is a graph depicting stability lobes for depth of cut with respect to cutting speed for a tool without process damping.
Figure 8:
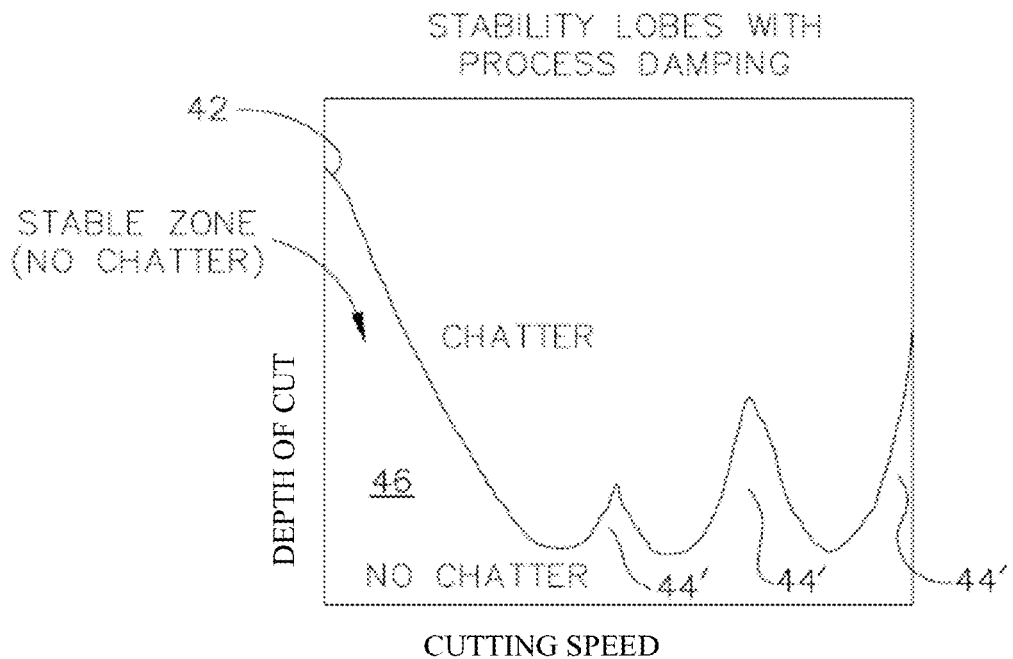
FIG. 8 is a graph depicting resulting stability lobes for depth of cut with respect to cutting speed for a tool employing process damping provided by the present invention.

Similarly, a stability zone prior to onset of chatter of the tool is achieved for cuts of, greater depth as shown in FIGS. 7 and 8. For a tool without the present invention, the "no chatter" region 40 is limited to a an onset value 42 for depth of cut based on cutting speed as shown in FIG. 7. Certain stability lobes 44 are present at higher cutting speeds. Employing the present invention provides a significant stability zone 46 to a much higher onset value for chatter as shown in FIG. 8. Additionally, the stability lobes 44' are increased in area providing increased functionality for machining soft metals. The tool frequency changes via mass removal can be employed to align a stability lobe with the top speed of a spindle for improved machining rates.

Figure 9A:
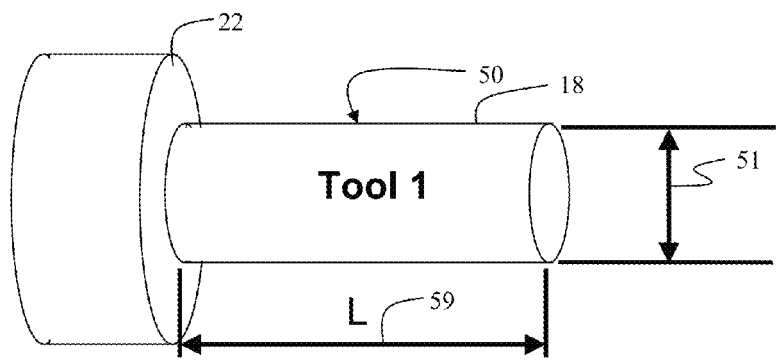
FIGS. 9A through 9C demonstrate tools with solid shank and various diameter central bores to demonstrate the method of the present embodiments.
Figure 9B:
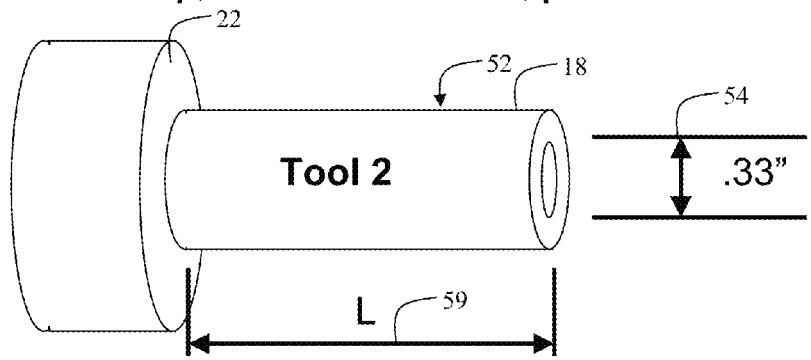
Figure 9C:
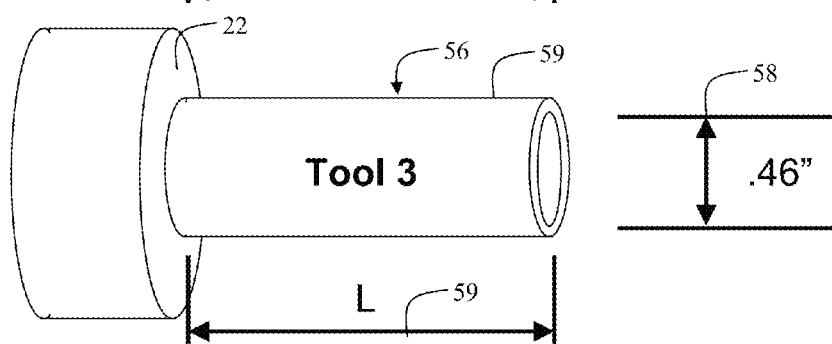
Figure 10:
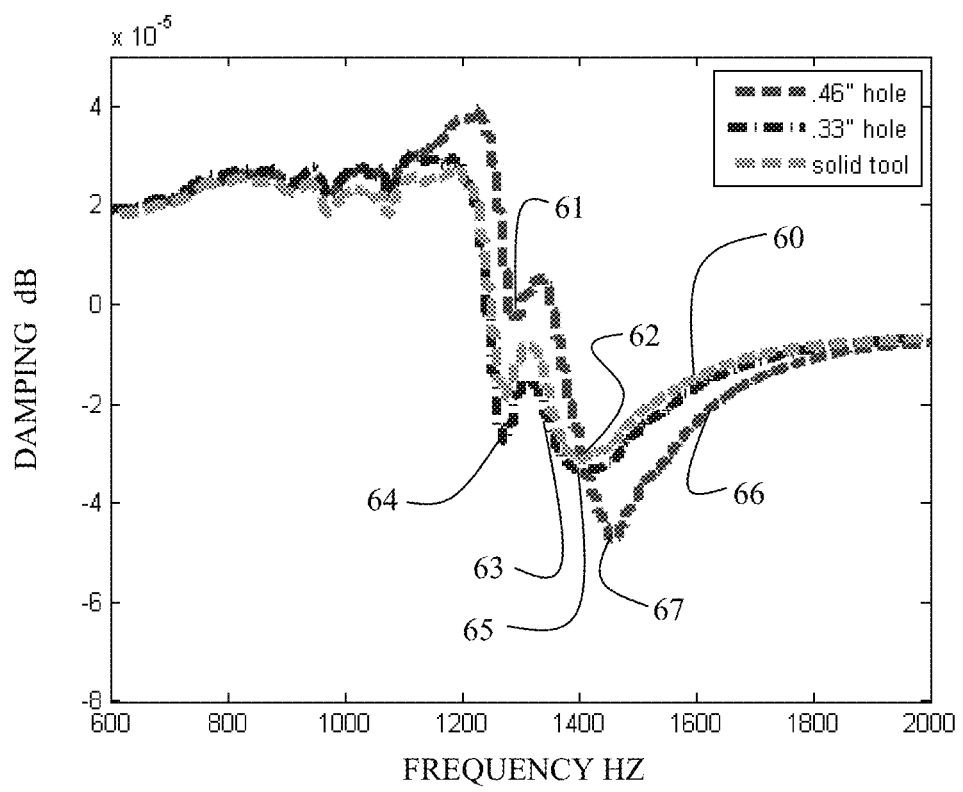
FIG. 10 is a graph of resonant frequency response for the tools shown in FIGS. 9A-9C.

Exemplary data has been obtained for comparative tools shown in FIG. 9A-9C using a standard tool 50 with solid shank 18 having a 1 inch diameter 51, a first reduced wall tool 52 having a shank 18 with a 0.33 inch center bore diameter 54 and a second reduced wall tool 56 having a shank 18 with a 0.46 inch center bore diameter 58. Length 59 of each of the tools is 4.050 inches from the chuck attachment 22 to the extent of the cutting edges which are not shown in detail in FIGS. 9A-9C. As previously discussed with respect to FIG. 5, increasing the resonant frequency of the tool provides for enhanced performance through smearing by the clearance ramp. The resonant frequency is increased from that of standard tool 50 shown in trace 60 of FIG. 10 by implementing a center bore to remove sufficient mass in the tool. For the standard tool, resonance of the spindle is shown in inflection point 61 at approximately 1200 Hz. The resonance of the tool 50 is shown at inflection point 62 at approximately 1380 Hz. The difference between spindle shaft frequency and cutting tool, frequency needs to be a multiple of the spindle rotation frequency. The natural frequency desired can be calculated as described above or through the use of finite element modeling. How much mass needs to be removed from the cylinder of the tool shank to make the difference between the spindle resonant frequency and the tool resonant frequency by the spindle rotation frequency can be approximated for a cylindrical tube with open ends of inner radius $r_1$, outer radius $r_2$, length h and mass m by the equations $$I_z = \tfrac{1}{2} m (r_1^2 + r_2^2)$$

$$I_x = I_y = \tfrac{1}{12}(m)[3(r_2^2 + r_1^2) + h^2]$$

Or when defining the normalized thickness $t_n = t/r$ and letting $r = r_2$, then $$I_z = mr^2(1 - t_n + \tfrac{1}{2} t_n^2)$$

With a density of $\rho$ and the same geometry $$I_z = \tfrac{1}{2} \pi \rho h (r_2^4 - r_1^4)$$

A threshold for mass removal from the tool shank by the center bore to achieve both a desired resonant frequency increase and added stability as discussed below can be determined. Trace 63 shows the resonant frequency of the spindle at inflection point 64 comparable to the solid tool and of first reduced wall tool 52 at inflection point 65 also comparable to the solid tool. Trace 66 for second reduced wall tool 56 shows the resonant frequency of the spindle is consistent with the other two tools however an increase of approximately 100 Hz at inflection point 67. Second reduced wall tool 56 employing a center bore of 0.46 inches exceeds the threshold in the exemplary spindle and an increase of 100 Hz over the other two tools can be achieved.

Figure 11A:
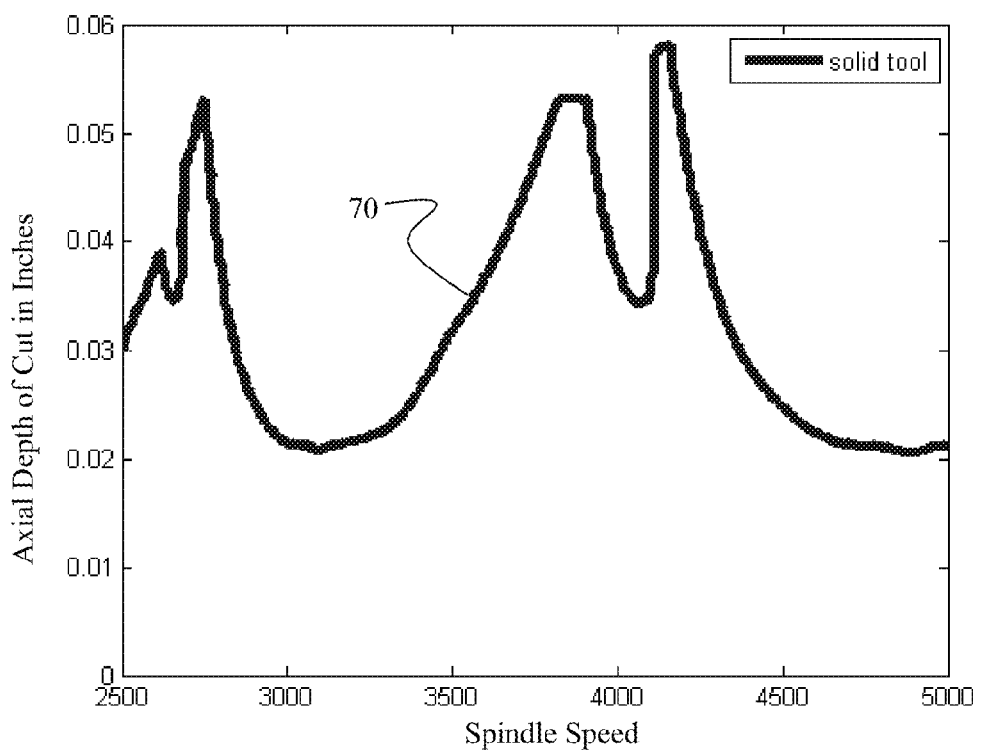
FIGS. 11A through 11D graphs depicting resulting stability lobes for depth of cut with respect to cutting speed for the tools of shown in FIGS. 9A-9C; and, FIG. 12 is a flowchart of the method for tool fabrication for optimizing tools of the embodiments disclosed.
Figure 11B:
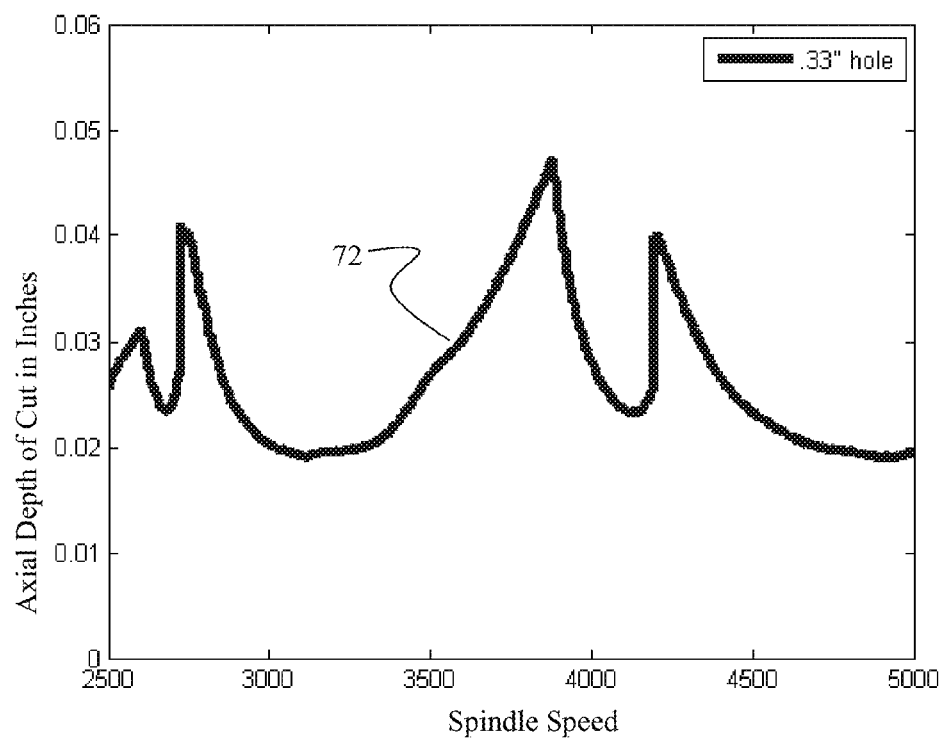
Figure 11C:
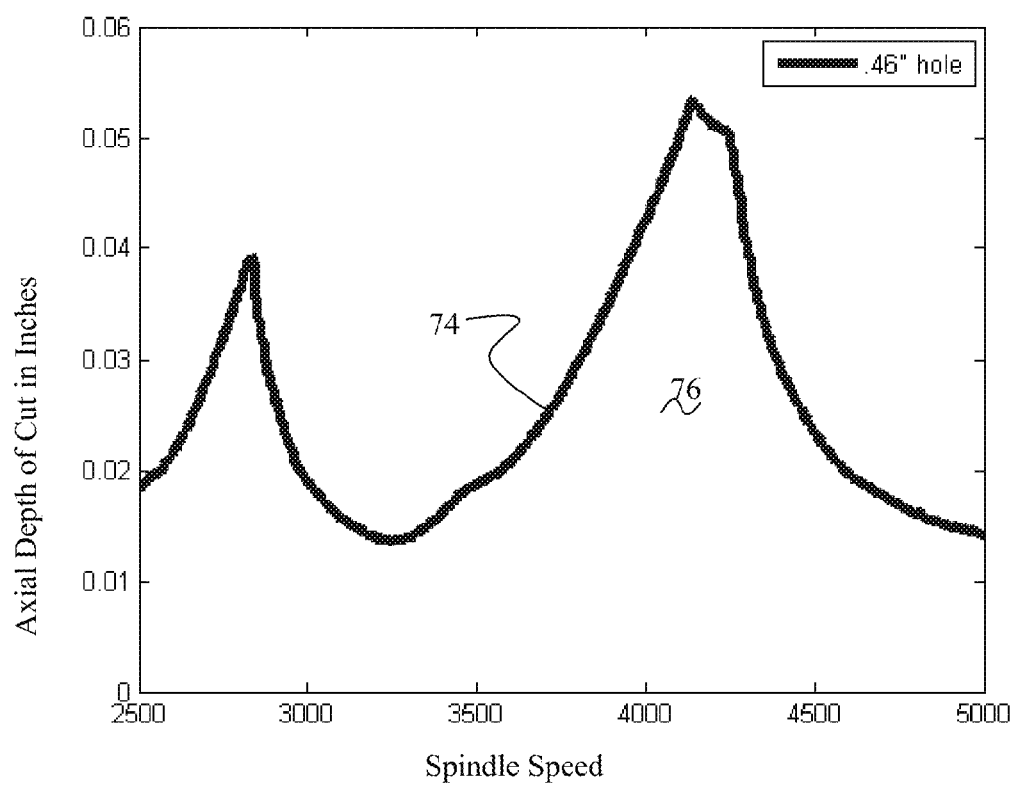
Figure 11D:
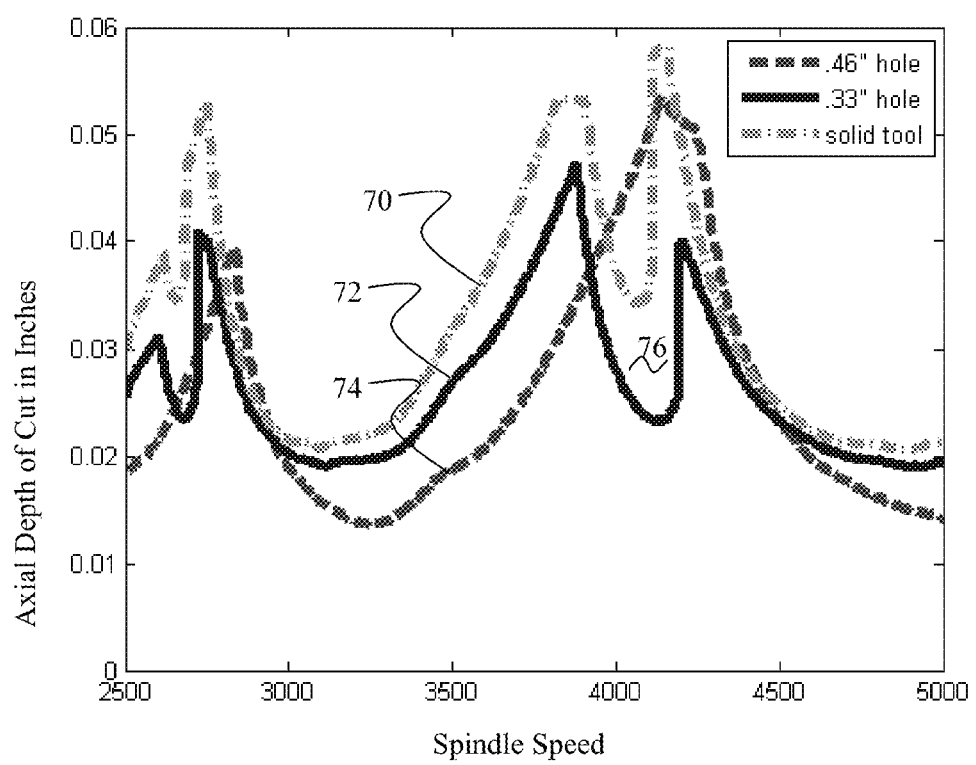

As previously described, modification of the stability lobes for prevention of chatter is also accomplished by mass removal by the center bores. As shown in FIGS. 11A-11D individually and then combined for the solid shank tool, trace 70, the first reduced wall tool, trace 72, and the second reduced wall tool, trace 74, the increase in stability of the second reduced wall tool 56 provides a significantly widened stability lobe 76 providing performance improvement for depth of cut over the other tool configurations. Stability lobes are calculated for a limiting depth of cut, Blim, using the published Thusty Method as Blim=1/(2*Ks*Re(G)*mu), where G is the tool compliance function, Ks is specific cutting pressure of the material, mu is a coefficient related to number of flutes and radial immersion. Blim is the maximum stable depth of cut. In the example of a 10 flute cutter, the depth of cut was increased from 0.020" for the standard tool 50 having a sold wall to 0.050" by using the embodiment of the second reduced wall tool 56 as shown in FIG. 11D. For a two flute cutter, the depth of cut would be increased from 0.1" to 0.25"

Figure 12:
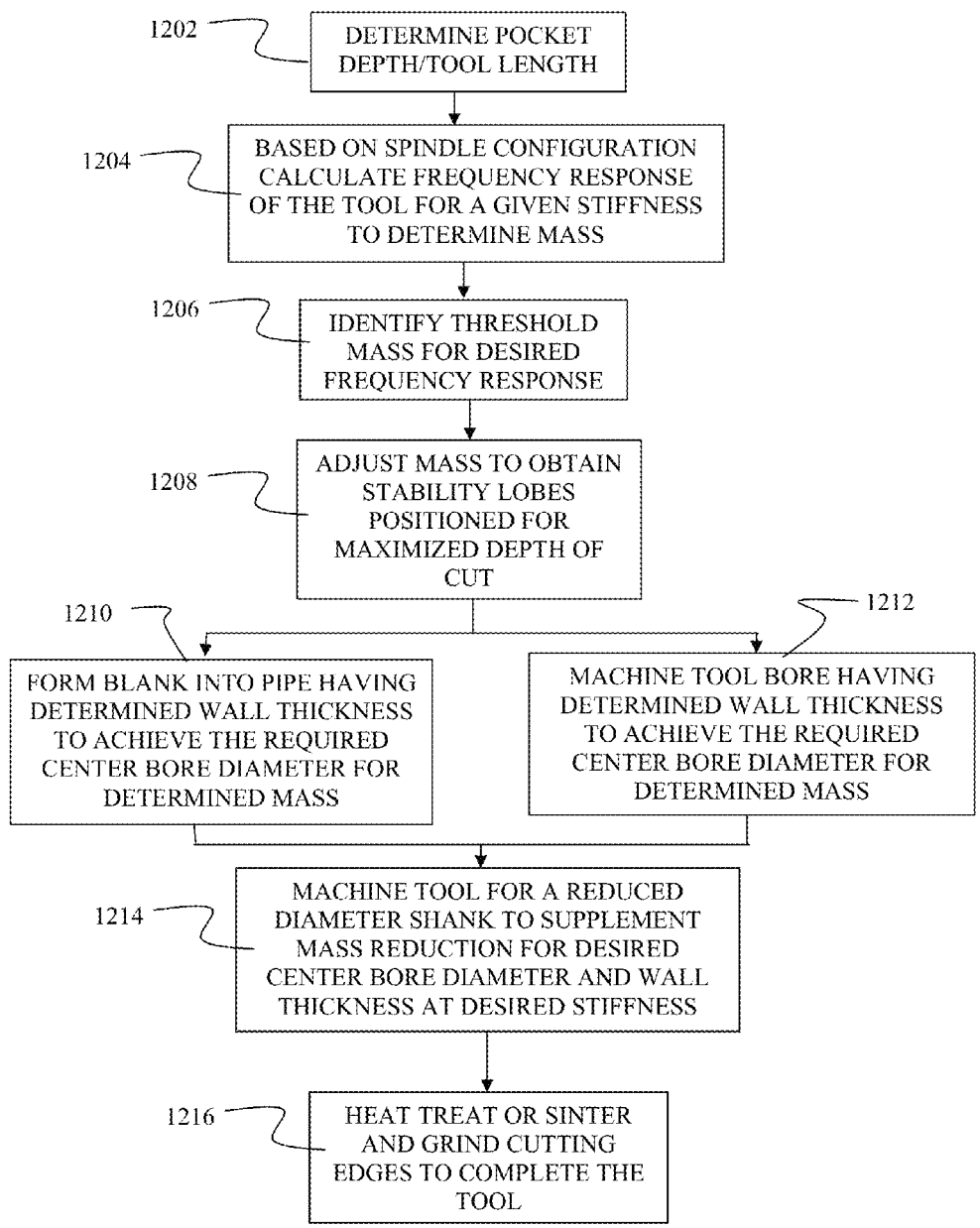

FIG. 12 demonstrates the method for design and fabrication of tools achieving the desired performance improvement through mass reduction by implementing a center bore. A pocket depth and associated tool length is determined, step 1202. Based on the spindle configuration the frequency response of the tool is calculated for a given mass stiffness to determine a desired mass, step 1204 and a threshold is determined for establishing the desired resonant frequency increase, step 1206. Mass of the tool is adjusted by varying the diameter of a center bore to obtain stability lobes allowing the desired depth of cut, step 1208. A carbide or steel blank is then formed into a pipe having the determined wall thickness to achieve the required center bore diameter for the determined mass, step 1210 or alternatively, a solid tool is machined to create the center bore, step 1212. In varying methods, the tool is then machined for a reduced diameter shank as a supplemental means for mass reduction for desired center bore diameter and wall thickness at desired stiffness, step 1214. Heat treating or sintering and grinding of cutting edges is then accomplished to complete the tool, step 1216.

The embodiments disclosed have been tested and provide the ability for use for pockets up to 4 inches in depth. At this depth, the new hollow reduced mass cutting tool is more than twice as productive as a prior art solid counterpart. Pockets of up to 8 inches in depth are anticipated to be within the capability of the tool. The embodiments disclosed herein allow more productive use of long, slender end mills, which are traditionally problematic.

Having now described exemplary embodiments for the invention in detail, as required by the patent statutes, those skilled in the art will recognize modifications and substitutions to the specific embodiments disclosed herein. Such modifications are within the scope and intent of the present invention as defined in the following claims.

What is claimed is:

1. A method for fabrication of a cutting tool comprising the steps of:
   establishing a threshold for a mass for resonant frequency and stability of a cutting tool having a tool body;
   reducing the cutting tool mass below the threshold by introducing a central bore in the tool body for a reduced wall shank;
   grinding cutting edges at one end of the tool body.

2. The method as defined in claim 1 further comprising preforming a carbide or steel blank into a cylindrical pipe as the tool body.

3. The method as defined in claim 1 wherein the tool body is cylindrical and introducing a central bore comprises:
   drilling an axial bore in the tool body.

4. The method as defined in claim 1 further comprising the step of filling the central bore with a vibration absorbing material.

5. The method as defined in claim 4 wherein the vibration absorbing material is a light weight polymer.

6. The method as defined in claim 5 wherein the light weight polymer is Silicone RTV.

7. The method as defined in claim 4 wherein the vibration absorbing material is selected from the set of metallic or nonmetallic shot or pellets, a viscous liquid, oil or water, a resin, or a metal dissimilar to the body with higher material damping.

8. The method as defined in claim 1 further comprising the step of machining the tool body intermediate the cutting edges and a chuck mount distal the cutting edges as a portion of the step of reducing the cutting tool mass.

9. The method as defined in claim 1 further comprising the steps of:
   determining pocket depth and tool length;
   calculating frequency response of the tool based on a spindle configuration for a given stiffness to determine mass;
   identifying a threshold mass for desired frequency response; and,
   adjusting mass to obtain stability lobes positioned for maximized depth of cut; and
   defining a diameter for the central bore based on the adjusted mass.

10. A cutting tool comprising:
    a body terminating in cutting edges distal from a chuck mount, the body having an axial bore of a diameter determined by identifying a threshold mass for desired frequency response and adjusting mass to obtain stability lobes positioned for maximized depth of cut.

11. A cutting tool as defined in claim 10 wherein the body is formed from a carbide blank.

12. A cutting tool as defined in claim 10 wherein the body is formed from a steel blank.

13. A cutting tool as defined in claim 10 wherein the axial bore is filled with a vibration absorbing material.

14. A cutting tool as defined in claim 13 wherein the vibration absorbing material is a light weight polymer.

15. A cutting tool as defined in claim 13 wherein the vibration absorbing material is selected from the set of metallic or nonmetallic shot or pellets, a viscous liquid, oil or water, a resin, or a metal dissimilar to the body with higher material damping.

16. A cutting tool as defined in claim 10 wherein the body is a blank preformed into a cylindrical pipe.

\* \* \* \* \*